Figure 5:
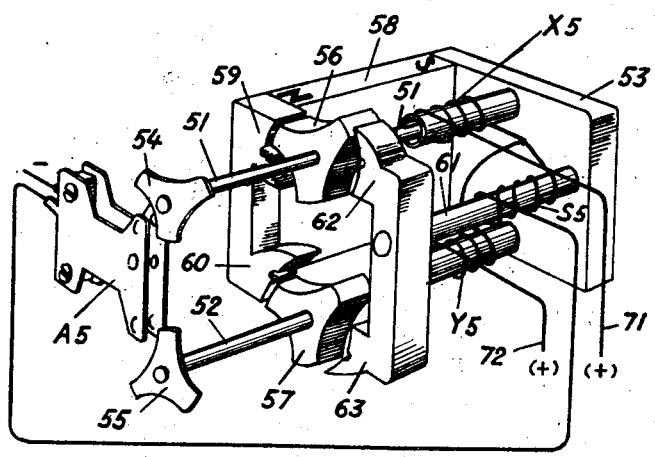

July 16, 1946.  S. E. WERNER  2,404,332
MOTOR FOR TELEPHONE SELECTORS
Filed Feb. 16, 1944  2 Sheets-Sheet 1
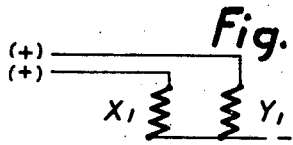
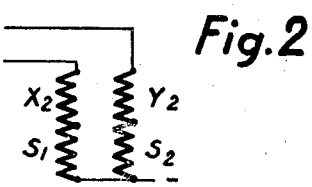
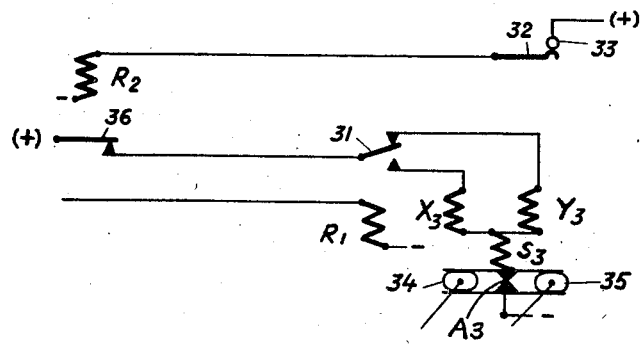
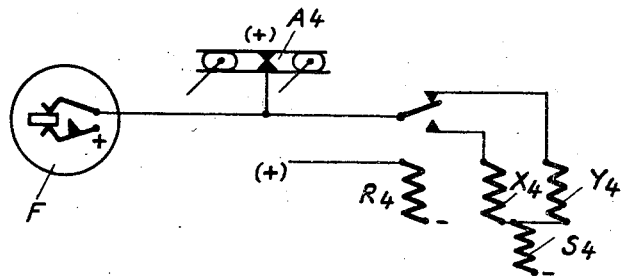
Inventor
S. E. Werner
By Glascock Downing & Seebold
Attys.

Patented July 16, 1946

2,404,332

UNITED STATES PATENT OFFICE 2,404,332

MOTOR FOR TELEPHONE SELECTORS

Sture Edvard Werner, Stockholm, Sweden, assignor to Telefonaktiebolaget L. M. Ericsson, Stockholm, Sweden, a company of Sweden Application February 16, 1944, Serial No. 522,668
In Sweden January 13, 1943

7 Claims. (Cl. 172—36)

The invention relates to an electro-motor for operating teletechnical apparatus, especially such automatic telephone selectors, whose contact arms have two directions of movement. Hitherto, a motor combined with a special switching device has been employed for the operation of such selectors. In order to avoid this kind of switching device, the structure of which is relatively complicated, the use of two separate motors has been proposed. However, two motors require a double equipment of stators and commutators and the object of the present invention is to produce a built-together motor with two rotors so that said parts, entirely or partly, may be rendered common to both directions of movement. According to the invention this is achieved chiefly by the motor being provided with a stator with a constant magnetic flux produced by a magnet, and with two rotors being disposed at different points of the magnetic flux so as to be operated individually when electrical impulses are sent through one of the two motor windings corresponding to these rotors.

The invention will be explained more in detail with reference to the accompanying drawings. Figs 1–4 show different electrical switching diagrams for a rotor according to invention, and Fig. 5 illustrates an example of the structure of the motor with connections similar to those shown in Fig. 3. In this figure only those parts of the motor are shown as being of importance for a better understanding of the invention.

The motor shown in Fig. 5 has two rotor shafts 51, 52 of magnetically conducting material. The shafts are interposed in a yoke 53 and in not shown parts of the motor. Each shaft 51, 52 is provided in one of its end points with a cam disc 54 or 55 respectively of insulating material with three teeth which, at the turning of the corresponding shaft, actuate a common self-interrupter A5 which is fixed to now shown parts of the motor frame. A circuit passing over this interrupter A5 is broken a brief moment every time a tooth on any of the discs 54 or 55 actuate the interrupter. A rotor consisting of a three-parted armature 56 or 57 respectively is fixed on every shaft 51, 52. The stator of the motor contains a permanent magnet 58 common to the armatures which magnet has a north pole N and a south pole S. The magnet has a pole piece 59 and 60 respectively for every rotor and these pole pieces are provided as usual with noses to indicate the direction of rotation. Moreover, the stator consists of a core 61 common to the rotors and fixed in the yoke which core also carries a pole piece 62, 63 for each rotor and is provided with a nose indicating the direction. Both rotor shafts 51, 52 respectively are encircled each by its winding X5 or Y5 respectively, fixed on a tube fastened on the yoke 53. These windings do thus not contribute to the rotating movement of the shafts. The core 61 is also provided with a winding S5.

The operation of the motor will now be closer described, the movement of one of the rotors 56 being described first. The three-parted armature 56 is maintained in the initial position of the constant magnetic flux as shown in the drawings, the flux being produced by a permanent magnet 58. This flux passes from the magnet over pole piece 59 through armature 56 and armature shaft 51 and through a part of the yoke 53 back to the magnet. Assume that an impulse is sent through the winding X5 from the conductor 71, a flux is produced through shaft 51 which, in the embodiment as shown in the drawing has the opposite direction to the constant flux produced by the magnet and forces this to take another path. The flux of the motor winding X5 will now be closed over the one of the armature poles which is immediately adjoining the nose of the pole piece 62 and over the iron core 61 and the yoke 53. The armature 56 then turns a first step 60°, one of its poles thereby being centered in front of the pole piece 62. As soon as the impulse through winding X5 ceases, only the permanent flux from magnet 58 remains which then is closed anew through the rotor shaft 51. The armature now turns a second step 60° in the same direction as before until one of its poles arrives right in front of the pole piece 59. The armature now has moved an entire angular step 120°. For each subsequent impulse the turning of the armature takes place in the same direction (clockwise) and in the manner now described.

The second rotor 57, which remains motionless during the above described operation, will be actuated in the same manner as the rotor 56, when impulses are emitted over winding Y5 on shaft 52. This armature is namely traversed—as is the case with the armature 56—by a constant magnetic flux originating in the permanent magnet 58. However, the noses of the pole pieces 60 and 63 are located so that the armature 57 will rotate in opposite direction (counter-clockwise) to the armature 56.

Amplification of the magnetic efficacy from winding X5 and Y5 respectively is achieved if winding S5 around the core 61 is energized simultaneously with winding X5 and Y5 respectively, producing a magnetic flux co-operative with the flux from that winding. The winding S5 is connected in series with each of the windings X5 and Y5. Since the core 61 is common to the two rotors 56 and 57 and is located symmetrically in relation to the shafts 51 and 52, a flux produced by the winding S5 will be closed over the two armatures 56 and 57, even if only one winding X5 or Y5 is energized. Hence, the winding S5 should be dimensioned so that the flux passing over the rotor being inactive at the time does not actuate the rotor which has to remain inactive during the movement of the other rotor.

Should battery positive in the embodiment of the motor windings as shown in Fig. 5 be connected to a conductor 71 leading to winding X5, and negative battery to the self-interrupter A5, a circuit will be closed through winding X5, winding S5 and over the self-interrupter A5. As described above the armature 56 will now turn clockwise. However, the cam disc 54 on shaft 51 is so disposed that, as soon as the shaft 51 has turned almost 60°, it breaks the contact between the two contact springs of the self-interrupter, thus causing interruption in the circuit over windings X5 and S5. Thus the rotor 56, being influenced by the constant magnetic flux, will turn a further 60°. At the termination of this movement the cam disc 54 is turned out of gear with the contact springs of the self-interrupter which again close the circuit through windings X5 and S5. With the aid of this self-interrupting arrangement the rotor 56 will be set in continuous rotation as long as battery positive is kept connected to conductor 71.

The rotor 57 is set in rotation in the same manner as battery positive is connected in to a conductor 72, this being associated with winding Y5.

The windings of the rotor may be disposed and connected to the self-interrupter in various manners. Examples hereof are given in Figs. 1–4, in which the designations X1—X4, Y1—Y4 and S1—S4 indicate windings corresponding to windings X5, Y5 and S5 respectively in Fig. 5.

Fig. 1 illustrates a simple embodiment without winding encircling the core common to the rotors, and Fig. 2 an embodiment, in which the winding corresponding to winding S5, Fig. 5 has been divided into two parts windings X2 and Y2, respectively, whereby entirely divided circuits influenced by the two rotors are obtained.

In Fig. 3 the windings X3, Y3 and S3 and self-interrupter A3 are connected in a manner similar to corresponding parts in Fig. 5. The cam discs 54 and 55 in Fig. 5 correspond to the details marked 34 and 35 in Fig. 3. Fig. 3 shows likewise an example of a circuit arrangement for the motor when used as a driving device for a line-finder with two directions of movement. In the figure R1 is a relay which is operated when the movement of direction of the selector is to be altered, in which case it operates its contact 31. This relay is operated by devices not shown on the drawing. Fig. 3 comprises also the test circuit for one of the directions of movement of the selector. That circuit passes over test relay R2 and over the selector contact arm 32. When this contact arm during the motion of the selector encounters a contact 33 connected to battery positive, a circuit is closed through test relay R2 which immediately breaks its contact 36 and thereby also the circuit over windings Y3 and S3 and over the self-interrupter A3. The selector then stops immediately. Should thereafter the relay R1 receive current it connects the winding X3 to the driving circuit. As soon as the latter again is energized over not shown devices, the second rotor of the selector will be operated. This movement is stopped in a manner described in connection with break of the circuit through winding Y3.

Fig. 4 shows a device for operation of an automatic selector with two directions of movement both by impulses from a dial F and by impulses over a self-interrupting contact A4. The relay employed for connection of the various rotor windings X4 and Y4 is in this example named R4. If now positive is connected to the upper contact spring in interrupter A4, the condition will be the same as described in connection with Fig. 3. If instead the dial F is set in rotation, impulses from the position of relay R4 shown in the figure will be sent through windings X4 and S4 and the corresponding rotor will be set in rotation in analogy with the number of impulses emitted over the dial. As soon as the second rotor is to operate, the relay R4 will be actuated in known manner.

I claim:

1. In an electro-magnetic motor for driving teletechnic devices, two rotors, a motor winding for each rotor operative when energized to effect a step-wise movement of the related rotor, and magnetic means common to both said rotors and exerting a constant magnetic influence on said rotors, said means being operative when either winding is de-energized to effect a second step-wise movement of the related rotor.

2. An electro-magnetic motor as claimed in claim 1 wherein a rigid support is arranged about each motor supporting the related winding.

3. An electro-magnetic motor as claimed in claim 1 wherein each winding acts on the related rotor in opposition to said means.

4. Arrangement according to claim 1, wherein the rotors are so disposed in relation to the constant magnetic flux from the magnetic means and to the flux produced by the windings that the varying flux produced at the operation of one rotor does not set the other rotor in operation.

5. Arrangement according to claim 1, wherein the magnetic means common to the rotors has a pair of pole pieces for each rotor.

6. Arrangement according to claim 1, wherein a stator core is provided with a winding which is connected in series with each one of the two windings.

7. Electro-motor according to claim 1, wherein the windings are connected in parallel to a self-interrupting contact which is common to them and which may be operated by any of the cam discs which are mounted on the rotor shafts.

STURE EDVARD WERNER.